United States Patent [19]

Becker et al.

[11] 4,175,805

[45] Nov. 27, 1979

[54] ONE-PIECE INTERMEDIATE MEMBER FOR ANTI-FRICTION BEARINGS

[75] Inventors: Dieter Becker, Lippstadt-Esbeck; Alois Stenert, Lippstadt, both of Fed. Rep. of Germany

[73] Assignee: Hoesch Werke Aktiengesellschaft, Dortmund, Fed. Rep. of Germany

[21] Appl. No.: 924,342

[22] Filed: Jul. 13, 1978

[30] Foreign Application Priority Data

Mar. 13, 1976 [DE] Fed. Rep. of Germany.. 26 10707

Related U.S. Application Data

[63] Continuation of Ser. No. 777,127, Mar. 14, 1977, abandoned.

[51] Int. Cl.$^2$ .............................................. F16C 19/20
[52] U.S. Cl. ...................................... 308/199; 308/209
[58] Field of Search ............................... 308/199–200, 308/206, 209

[56] References Cited

U.S. PATENT DOCUMENTS 1,220,616   3/1917   Englerth ............................. 308/199
2,897,021   7/1959   Zeilman ............................. 308/199

Primary Examiner—Douglas C. Butler
Attorney, Agent, or Firm—Becker & Becker, Inc.

[57] ABSTRACT

A one-piece intermediate member for separating from each other anti-friction bodies of an anti-friction bearing. This intermediate member has a mantle surface adapted to the race cross section of the respective anti-friction bearing for which the intermediate member is intended. The intermediate member is by a dividing wall or partition extending substantially perpendicular to the axis of the intermediate member divided into two sections forming an image to each other. Each side of the dividing wall, which latter may e.g. be of synthetic material such as plastics, is provided with a reinforcement, e.g. in the form of a ring or a polygon, and this reinforcement is connected by webs to the mantle and has ribs extending from the reinforcement in the direction toward the axis of the intermediate member with the inner ends of the ribs being spaced from each other.

8 Claims, 7 Drawing Figures

ONE-PIECE INTERMEDIATE MEMBER FOR ANTI-FRICTION BEARINGS

This is a continuation application of parent application Ser. No. 777,127 filed Mar. 14, 1977, now abandoned.

The present invention relates to an intermediate piece for anti-friction bearings which piece forms a single piece and has a mantle surface in conformity with the cross section of the raceway and is subdivided by a wall, preferably of synthetic material.

Intermediate pieces of this type have become known and are arranged preferably with large bearings individually between the roller bodies. Such intermediate pieces are intended to prevent the antifriction bodies from directly contacting each other and as a result thereof to wear prematurely. U.S. Pat. No. 1,220,616 shows such intermediate piece for a ball bearing. Inasmuch as the antifriction bodies are able in view of different loads to move relative to each other, the intermediate pieces must be able to withstand such relative movement without being damaged.

A particular embodiment of intermediate pieces is illustrated in German Auslegeschrift No. 11 61 728 which corresponds to U.S. Pat. No. 2,897,021—Zeilmann issued July 28, 1959. More specifically, according to this embodiment, the intermediate piece has a fixed mantle of metal and a yieldable central part of synthetic material. This embodiment of intermediate pieces will meet the problem of being able to permit the balls elastically to rest against each other while they do not contact each other under pressure. These heretofore known intermediate pieces, especially when they are of synthetic material, have the drawback that they cannot withstand any material shock load without breaking apart. The broken pieces of said intermediate pieces become lodged between the antifriction bodies and the raceway and bring about damage to the bearing. Only the intermediate piece described in German Auslegeschrift No. 11 61 728 which consists of metal and synthetic material of different substances does not have the said drawback. The last mentioned intermediate member, however, requires considerable labor and material and therefore is relatively expensive.

It is, therefore, an object of the present invention to provide an intermediate member for an antifriction bearing which member consists of one piece and is able to transfer a predetermined force in axial direction of the bearing and substantially to retain its outer shape when said force is exceeded, until the adjacent antifriction body is contacted.

It is a further object of this invention to provide an intermediate piece as set forth in the previous paragraph in which as the result of an overload acting upon the immediate piece and the play occurring as a result between the antifriction bodies and the intermediate piece, no further destruction of the bearing will occur by tilting or a transverse placement of the intermediate piece.

These and other objects and advantages of the invention will appear more clearly from the following specification in connection with the accompanying drawings, in which.

Figure 2:
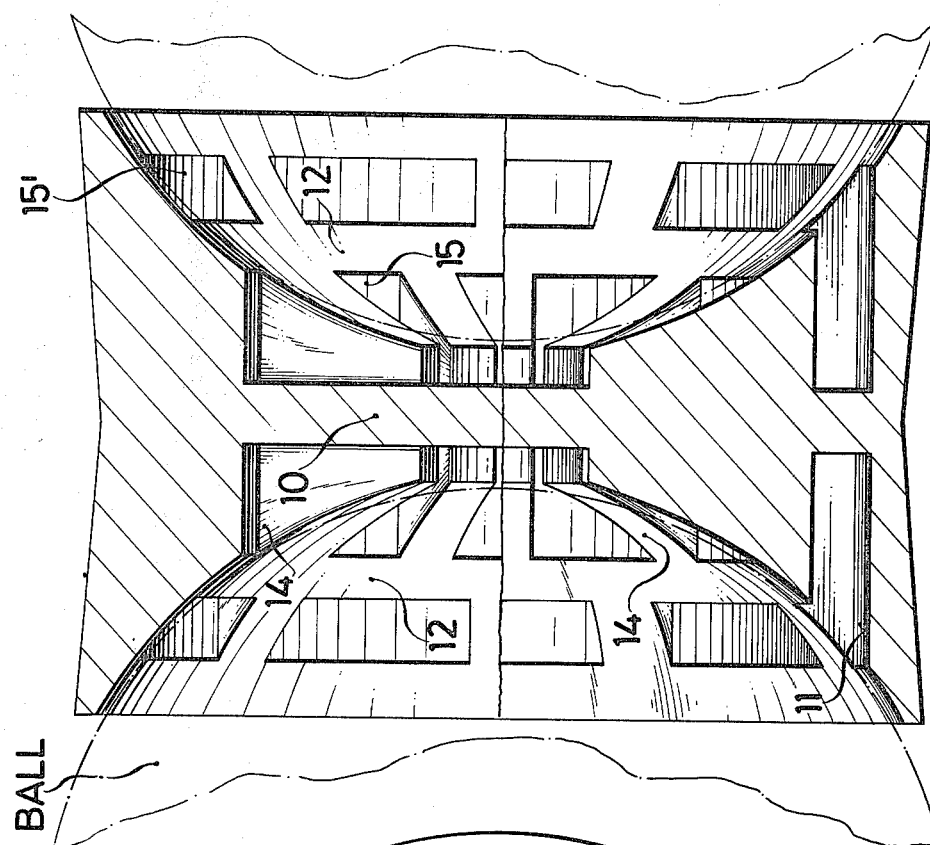
FIG. 2 represents a section taken along the line II—II of FIG. 1.

The intermediate piece according to the invention for anti-friction bearings which has a mantle surface in conformity with the cross section of the raceway and which is divided by a wall is characterized primarily in that on both sides of said wall and in spaced relationship to the mantle inner surface of the intermediate piece there is provided at least one reinforcement which is connected by webs to said wall and has ribs which are spaced from each other and extend in the direction toward the center of said intermediate piece.

According to a further feature of the invention, the free confinement of the webs, of the reinforcement, and of the ribs is adapted to or selected in conformity with the surface of the antifriction body, and expediently, the webs interconnected by the reinforcements and the ribs are arranged with a gap therebetween. The reinforcement of such intermediate piece may be in the form of a circular ring, of a closed polygon when an intermediate piece is involved which is inserted between antifriction bodies designed as balls, or in the form of a zigzag line when rollers are inserted as antifriction bodies while the ribs extend centrally to the center. Other shapes of reinforcement are also possible which would resolve the problem underlying the present invention.

A tilting and transverse placement of the intermediate pieces will be avoided when in conformity with the present invention the length of the intermediate piece equals a space diagonal which has a diameter within the range of from 105% to 150% preferably 110% of the diameter of the antifriction body. The space diagonal is confined by an end edge of the mantle of the intermediate piece and extends through the center of the intermediate piece in the plane perpendicular to the mantle surface through the longitudinal axis of the intermediate piece and extends to the other end edge of the mantle of the intermediate piece.

Intermediate pieces of this type have the advantage that they will not break into pieces when being subject to a shock load, as is the case with heretofore known one-piece intermediate pieces. The walls are so arranged to each other and dimensioned that they are able to convey in axial direction a force previously determined. The hollow spaces defined by the webs, reinforcements, and ribs will when the said predetermined force is exceeded, be able up to contacting an antifriction body to absorb the volume displaced by said antifriction bodies, of webs, ribs and reinforcements, and to do so by means of elastic and plastic deformation within the rigid circumferential mantle. Due to the arrangement of webs and ribs with a gap therebetween, the webs or ribs will be displaced into the respective radial hollow space. In this way, it will be assured that only radial forces of one magnitude are introduced into the mantle which the mantle can absorb without bursting. The reinforcement will in this instance burst. Due to the provision of the hollow spaces within a deformation resistant mantle, it is furthermore possible as is known :r se to introduce into said hollow spaces sliding substances as permanent lubrication.

In view of its one-piece design and its low material volume, the intermediate piece according to the invention has proved particularly economical. Moreover, in view of the low material volume, in contrast to solid intermediate pieces, a low mass inertia of the intermediate piece is realized which is advantageous with high-speed antifriction bearings.

The intermediate pieces shown in the drawings are intended to prevent the rolling bodies in an antifriction bearing from contacting each other and to separate the roller bodies which heretofore were arranged one adjacent to the other. The design of the intermediate piece is thus dependent on whether its embodiment is intended for antifriction bearings for which balls or rollers are selected as antifriction bearings so that the mantle of the intermediate piece must be designed in conformity with the cross section of the antifriction bearing raceway.

Figure 1:
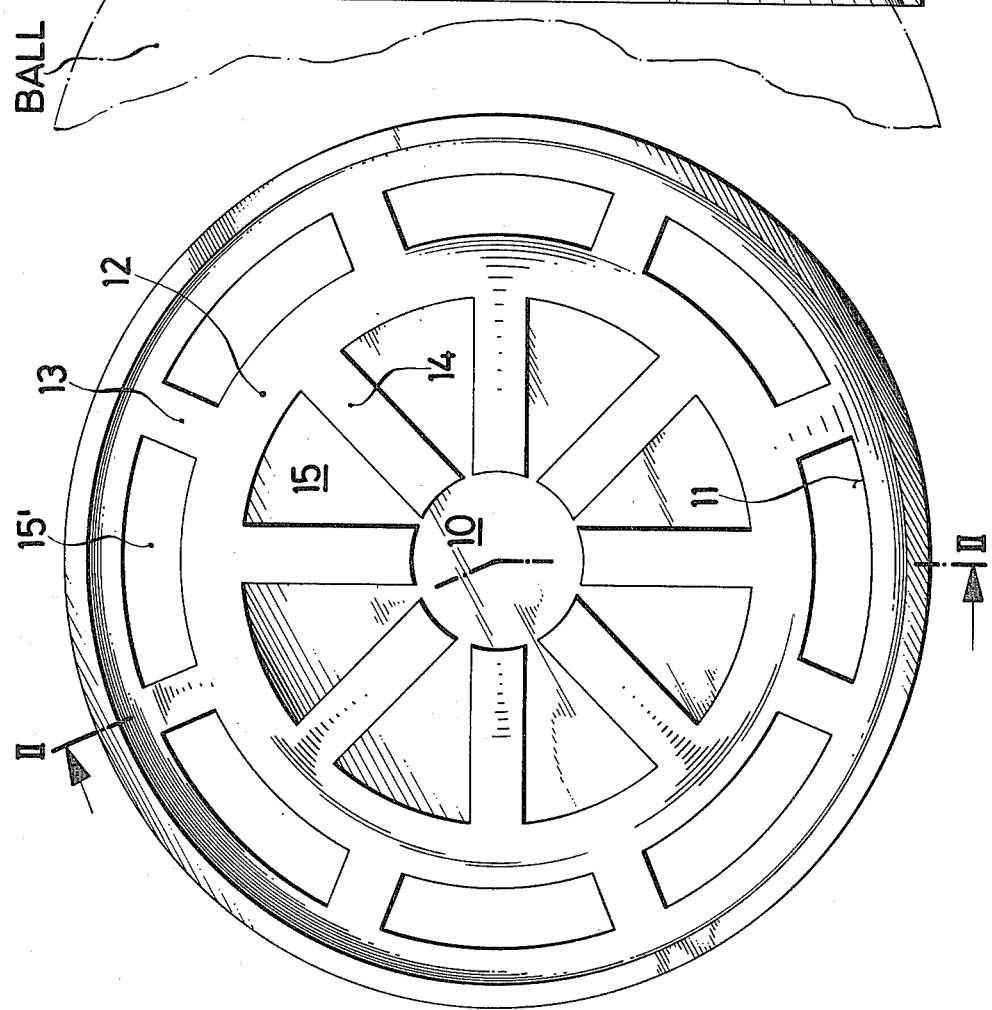
FIG. 1 illustrates a side view of an intermediate piece according to the invention for a ball bearing with a reinforcement in the form of a circular ring.
Figure 4:
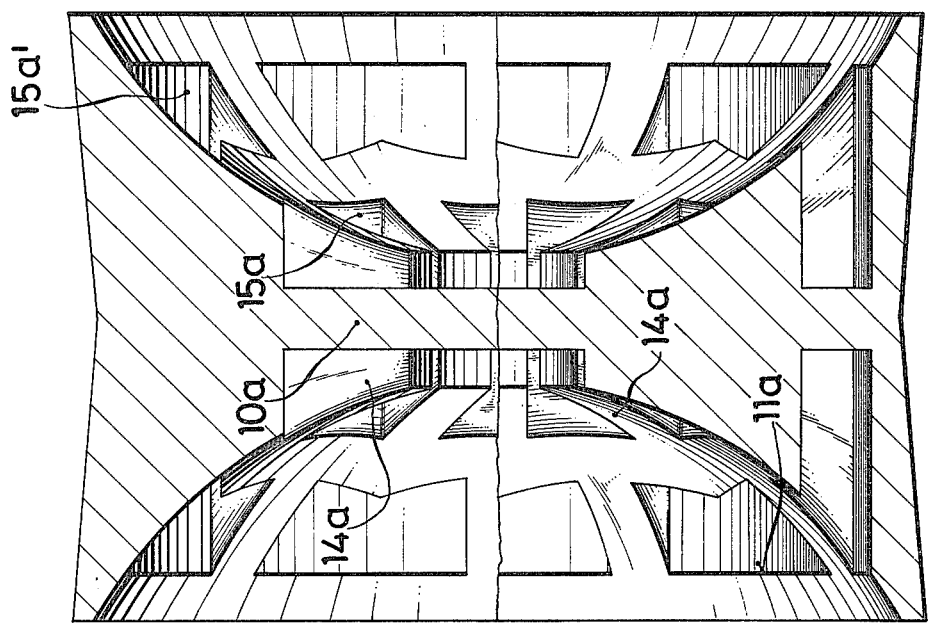
FIG. 4 is a section taken along the line IV—IV of FIG. 3.
Figure 3:
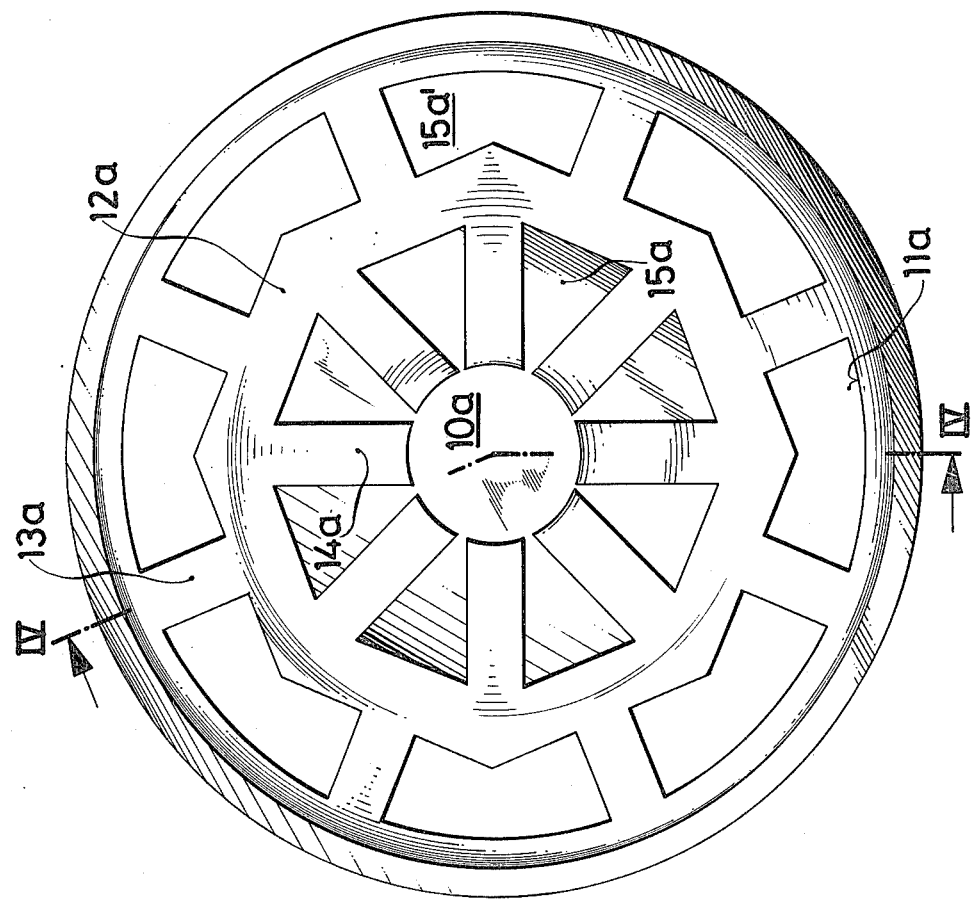
FIG. 3 is a side view of a modified intermediate piece according to the invention for a ball bearing with a reinforcement, in the form of a closed polygon.
Figure 5:
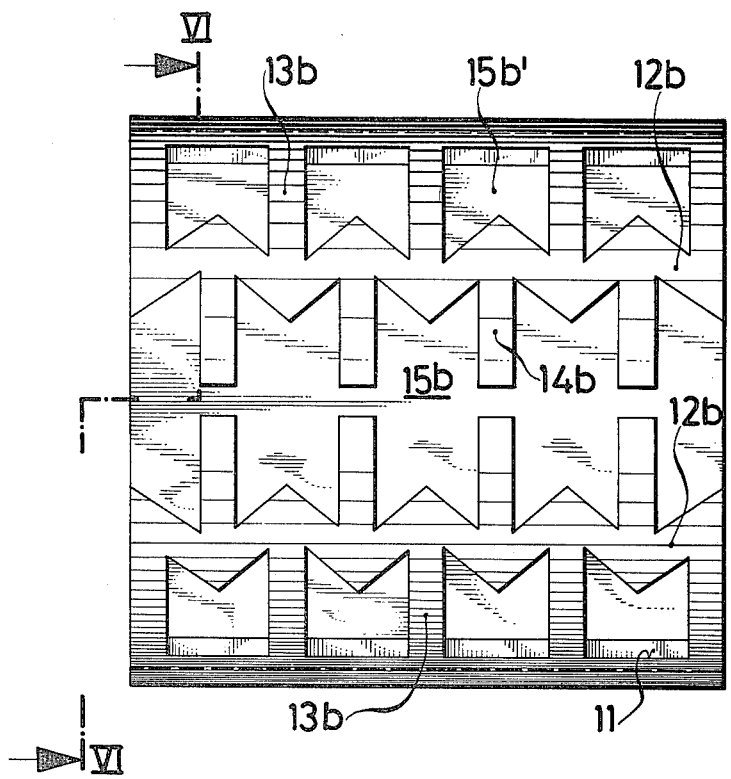
FIG. 5 is a longitudinal section of an intermediate member for a roller bearing with reinforcements, in the form of a zigzag line.

Referring now to the drawings in detail, with intermediate pieces for ball bearings as illustrated in FIGS. 1-3, a cylindrical mantle is involved whereas with intermediate pieces for roller bearings shown in FIGS. 4 and 5, the mantle is formed by plane surfaces parallel to each other.

Figure 1A:
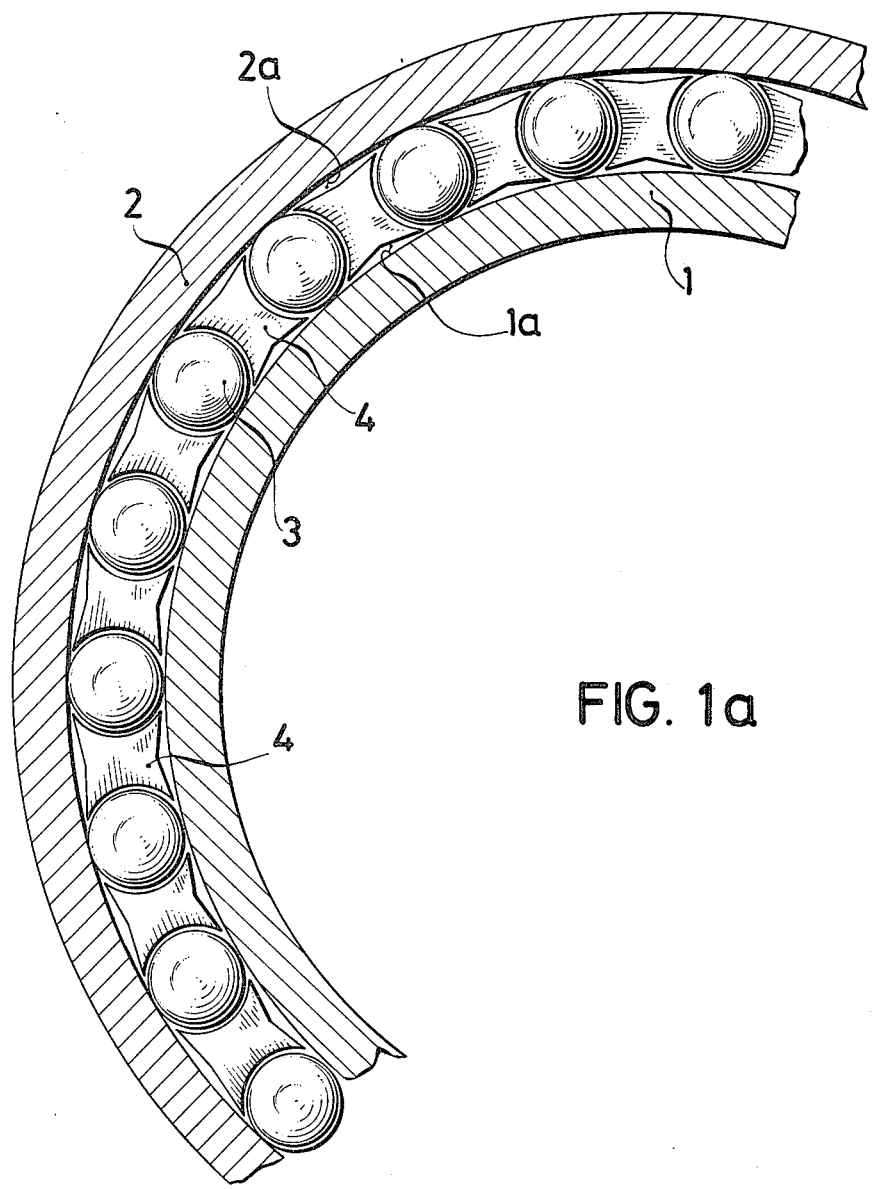
FIG. 1a illustrates rollers and raceways of an antifriction bearing in accordance with the present invention.

In connection with the FIG. 1a, the reference numeral 1 designates the inner race ring with the raceway 1a. The reference numeral 2 designates the outer race ring with the raceway 2a. The balls of the ball bearing shown in FIG. 1a are designated with the reference numeral 3, whereas the spacer member between each two adjacent balls is designated with the reference numeral 4.

More specifically, the intermediate member has the space inside the mantle divided by a wall or partition 10 shown in FIG. 2 as a vertical wall. On both sides of wall 10 dividing the space into two compartments, there is provided a grate-like structure including at least one reinforcement or strip-shaped reinforcing means 12 which is spaced from the mantle inner surface 11. The reinforcement 12 is joined by webs 13 connected to the mantle inner surface 11 forming peripheral supporting means insertable between the inner and outer raceways 1a, 2b of the anti-friction bearing. Ribs 14 are provided adjacent that side of the reinforcement 12 which faces the center of the intermediate piece and extend centrally in the direction toward the longitudinal axis when intermediate pieces are involved for ball bearings while extending vertically toward the longitudinal axis when intermediate pieces are involved for roller bearings. Ribs 14 and webs 13 are offset relative to each other while being arranged on the reinforcement 12 all included with the grate-like structure.

Figure 6:
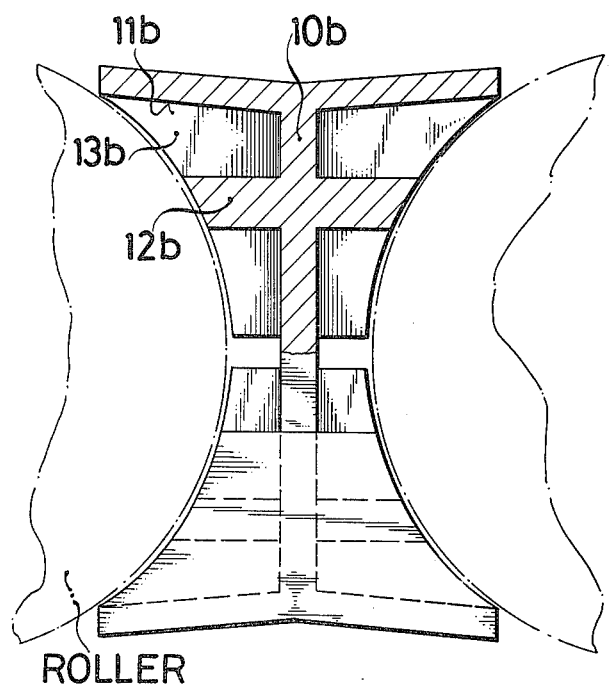
FIG. 6 is a section taken along the line VI—VI of FIG. 5.

The free confinement of the webs 13 of the reinforcement 12 and of the ribs 14 is adapted to the surface of the pertaining roller body. This confinement will thus with ball bearings over its region form a concave semi-spherical surface (FIG. 2), and with roller bearings will within its region form a concave cylinder surface (FIG. 6). The hollow spaces are designated with the reference numeral 15, 15' and serve for receiving and containing lubricating substances.

Those parts of the embodiments shown in FIGS. 3, 4, 5 and 6 which as to function correspond to elements in FIGS. 1 and 2 have been numbered correspondingly but with the additional characters "a" (FIGS. 3 and 4) and with the additional characters "b" (FIGS. 5 and 6) being used for identifying appropriate structural pieces and portions.

It is, of course, to be understood that the present invention is, by no means, limited to the specific showing in the drawings, but also comprises any modifications within the scope of the appended claims.

What we claim is:

1. For use in connection with an anti-friction bearing having an inner raceway and an outer raceway and a plurality of anti-friction bodies movably arranged between said inner and outer raceways; a spacer member having two oppositely located end faces defining a central axis as well as an interior of the spacer member therewith and consisting of a single integral piece for insertion between and engagement with two adjacent anti-friction bodies of said anti-friction bearing and including: peripheral supporting means insertable between the inner and outer raceways of said anti-friction bearing, a partition arranged radially inwardly of said peripheral supporting means and being substantially parallel to said end faces while dividing the interior of said spacer member into two compartments, each one of said compartments comprising a grate-like structure including strip-shaped reinforcing means coaxially arranged with and in spaced relationship to the central axis of said spacer member which is substantially perpendicular to said partition, said grate-like structure also including webs connecting said reinforcing means to said supporting means and also including ribs connecting said supporting means to said partition, said ribs having free inner ends spaced from said central axis, and said ribs and said reinforcing means and said webs defining surface sections curved in conformity with the curvature of the peripheral surface of the anti-friction bodies to be engaged by said spacer member.

2. A spacer member according to claim 1, in which said webs and said ribs are angularly offset with regard to each other.

3. A spacer member according to claim 1, in which said webs and ribs are interconnected by said reinforcing means, and in which said webs are separated from each other by gaps and also said ribs are separated from each other by gaps.

4. A spacer member according to claim 1, in which said reinforcing means have an annular shape.

5. A spacer member according to claim 1, in which said reinforcing means have a polygonal shape.

6. A spacer member according to claim 1, having a length which is defined by a space diagonal equalling from about 105% to 150% of the diameter of the anti-friction bodies to be contacted by said spacer member.

7. A spacer member according to claim 6, in which the length of the spacer member is defined by a space diagonal equalling about 110% of the diameter of the anti-friction bodies to be contacted by said spacer member.

8. A spacer member according to claim 1, in which said reinforcing means has a zigzag contour.

* * * * *